(12) United States Patent
Girard et al.

(10) Patent No.: US 10,099,514 B2
(45) Date of Patent: Oct. 16, 2018

(54) WEAR INDICATOR FOR A CIVIL ENGINEERING TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Dominique Girard, Clermont-Ferrand (FR); Olivier Ferlin, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 0 days.

(21) Appl. No.: 14/443,546

(22) PCT Filed: Nov. 12, 2013

(86) PCT No.: PCT/EP2013/073662
§ 371 (c)(1),
(2) Date: May 18, 2015

(87) PCT Pub. No.: WO2014/076101
PCT Pub. Date: May 22, 2014

(65) Prior Publication Data
US 2015/0328937 A1    Nov. 19, 2015

(30) Foreign Application Priority Data
Nov. 19, 2012 (FR) ..................... 12 60990

(51) Int. Cl.
*B60C 11/01* (2006.01)
*B60C 11/24* (2006.01)
*B60C 11/03* (2006.01)

(52) U.S. Cl.
CPC .............. *B60C 11/24* (2013.01); *B60C 11/03* (2013.01); *B60C 11/01* (2013.01);
(Continued)

(58) Field of Classification Search
CPC .... B60C 11/24; B60C 11/01; B60C 2011/013
See application file for complete search history.

(56) References Cited

U.S. PATENT DOCUMENTS 2,706,509 A * 4/1955 White ................. B60C 11/24
  116/208
3,253,634 A * 5/1966 De Young ............ B60C 13/001
  152/523

(Continued)

FOREIGN PATENT DOCUMENTS

DE  102008024075 A1 * 11/2009
EP  1679204       7/2006
(Continued)

OTHER PUBLICATIONS

Machine translation for Japan 2006-062584 (no date).*
(Continued)

*Primary Examiner* — Steven D Maki
(74) *Attorney, Agent, or Firm* — Dickinson Wright, PLLC

(57) ABSTRACT

Tire for a civil engineering vehicle comprising a tread of high initial thickness E, this thickness corresponding to the thickness of material which can be worn during use, this tread comprising a smooth rolling surface, i.e. without any recesses, intended to come into contact with the ground during rolling, this tread being limited axially by lateral faces, these lateral faces being extended radially on the tire (Continued)

by sidewalls, this tread being provided with a wear indicator device to visually indicate a wear level of the said tread, this tire being such that the wear indicator device comprises, in combination, a plurality of grooves formed on at least one of the lateral faces of the tread and, for each groove, a visual index indicating a wear level corresponding to the percentage of the initial thickness E remaining to be worn.

7 Claims, 2 Drawing Sheets

(52) U.S. Cl.
CPC ... *B60C 2011/013* (2013.01); *B60C 2200/065* (2013.01); *Y10T 152/10027* (2015.01)

(56) References Cited

U.S. PATENT DOCUMENTS

| | | | | |
|---|---|---|---|---|
| 4,856,572 | A * | 8/1989 | Casanova | B60C 13/02 152/454 |
| 6,807,995 | B1 | 10/2004 | Majumdar | |
| 2005/0081971 | A1 * | 4/2005 | Heinen | B60C 11/032 152/209.1 |
| 2005/0109440 | A1 | 5/2005 | Majumdar | |
| 2013/0333458 | A1 * | 12/2013 | Lamb | B60C 13/001 73/146 |
| 2014/0326375 | A1 | 11/2014 | Okabe | |

FOREIGN PATENT DOCUMENTS

| | | | |
|---|---|---|---|
| GB | 2265586 A | * | 10/1993 |
| GB | 2276130 | | 9/1994 |
| GB | 2312654 | | 11/1997 |
| GB | 2376002 | | 12/2002 |
| JP | 62-006114 U | * | 1/1987 |
| JP | 08-034213 | | 6/1996 |
| JP | 08-258517 | | 8/1996 |
| JP | 08-258517 A | * | 10/1996 |
| JP | 2000-238509 A | * | 9/2000 |
| JP | 2000-289414 A | * | 10/2000 |
| JP | 2006-062584 A | * | 3/2006 |
| JP | 2010-047073 | | 4/2010 |
| KR | 2007-011672 A | * | 1/2007 |
| WO | WO-00-66372 A1 | * | 11/2000 |

OTHER PUBLICATIONS

Machine translation for Japan 2000-289414 (no date).*
Partial machine translation for Japan 62-006114 U (no date).*
Machine translation for German 102008024075 (no date).*
Machine translation for Japan 2000-238509 (Year: 2018).*
Machine translation for Korea 2007-011672 (Year: 2018).*
Machine translation for Japan 08-258517 (Year: 2018).*
International Search Report for PCT/EP2013/073662 dated Jan. 20, 2014.

* cited by examiner

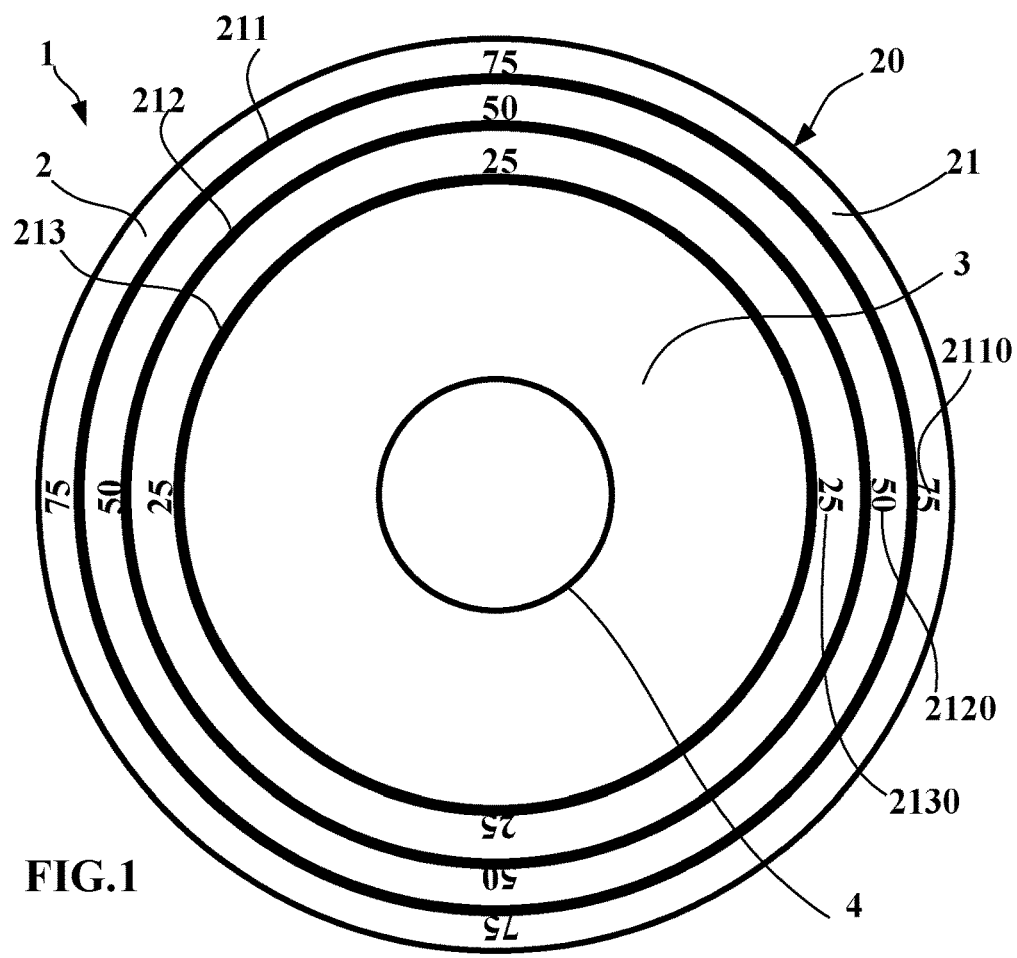
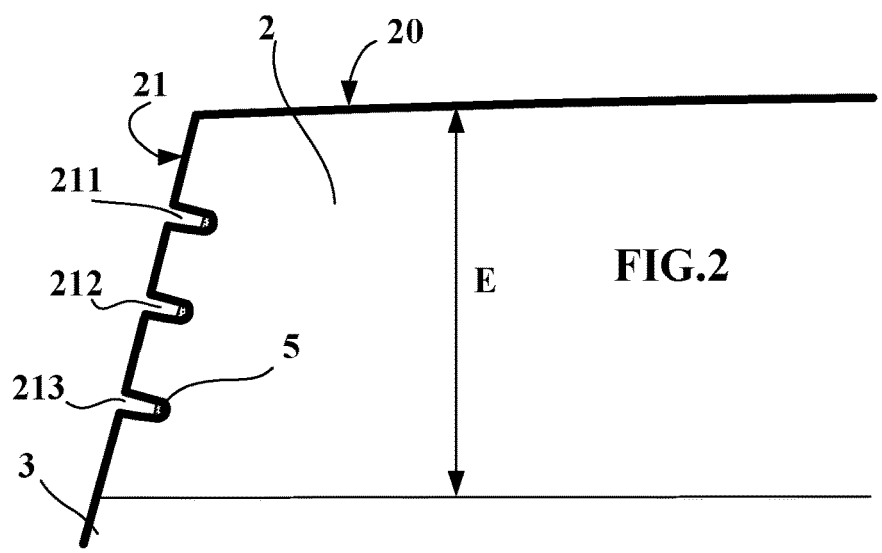

WEAR INDICATOR FOR A CIVIL ENGINEERING TIRE

This application is a 371 national phase entry of PCT/EP2013/073662, filed 12 Nov. 2013, which claims benefit of French Patent Application No. 1260990, filed 19 Nov. 2012, the entire contents of which are incorporated herein by reference for all purposes.

BACKGROUND

1. Field

The present disclosure relates to tires for civil engineering vehicles and more particularly to tires having treads having high thicknesses ("extra deep tread") and intended to equip vehicles employed in underground mines.

2. Description of Related Art

Works Vehicles used in underground mines, which are dark by nature, are equipped with tires whose treads are without any tread pattern. These tires roll along particularly hostile tracks and have a wear of their treads which must be able to be monitored to avoid any incident which would require difficult intervention resulting in mining being stopped.

The tires concerned here comprise treads having very high thicknesses of material to be worn; very high thicknesses are intended to mean here a thickness which is at least equal to 70 mm and can range up to 130 mm or even more.

Custom has resulted in the presence of at least one transverse notch in these treads so as to allow the wear of the tread to be monitored. These transverse notches are formed when molding the tire and open both onto the rolling surface of the tread and onto one of the lateral faces of this tread.

This wear-monitoring device makes it possible to carry out visually an evaluation of the remaining notch depth, but this is only an indicative evaluation of the remaining thickness. This same wear-monitoring device is not completely satisfactory since it is necessary, in order to know the remaining thickness, to carry out a measurement of the remaining depth of the notch with a suitable apparatus.

Moreover, each notch opening onto the rolling surface in the new state is a possible entry point of foreign bodies which may be found on the running tracks in the mines. These foreign bodies may then damage the tire or even promote tear-off of material and then disturb the reading of the remaining depth of material to be worn.

Moreover, it is known, see in particular GB-2312654-A, to form a tread by superposing two layers of different colors, the appearance of the second layer indicating a predetermined wear level.

Definitions:

Equatorial median plane: this is a plane perpendicular to the axis of rotation and passing through the points of the tire radially furthermost from the said axis.

Radial direction is intended to mean in the present document a direction which is perpendicular to the axis of rotation of the tire (this direction corresponds to the direction of the thickness of the tread).

Transverse or axial direction is intended to mean a direction parallel to the axis of rotation of the tire.

Circumferential direction is intended to mean a direction which is tangent to any circle centred on the axis of rotation. This direction is perpendicular both to the axial direction and to a radial direction.

The total thickness E of a tread is measured, on the equatorial plane of the tire provided with this tread, between the rolling surface in the new state and the radially outermost part of the crown reinforcement in the new state.

The usual tire rolling conditions or use conditions are those which are defined by the standard E.T.R.T.O. or by the standard T.R.A.; these use conditions stipulate the reference inflation pressure corresponding to the load capacity of the tire indicated by its load index and its speed code. These use conditions may also be termed "nominal conditions" or "usage conditions".

SUMMARY

The object of embodiments of the invention aims to propose a wear indicator for tires for civil engineering vehicles, these tires having treads of high thicknesses, this wear indicator allowing easy reading on the actual use site and in particular in darkness or semi-darkness conditions encountered in underground mines.

To this end, the subject of the invention is a tire for a civil engineering vehicle comprising a tread of high thickness E corresponding to the thickness of material which can be worn during use, this tread comprising, in the new state, a smooth rolling surface (i.e. without any recesses) intended to come into contact with the ground during rolling, this tread being limited axially by lateral faces, these lateral faces being extended radially by sidewalls of the tire, this tread being provided with a wear indicator device for the said tread.

This tire is characterized in that the indicator device comprises, in combination, a plurality of grooves formed on at least one of the lateral faces of the tread and, for each groove, a visual index indicating a wear level corresponding to the percentage of the initial thickness remaining to be worn.

The visual index may be in particular of the type: 75, 50, 25, corresponding to the remaining percentages of material to be worn, respectively 75%, 50%, 25% of the thickness E.

Advantageously, the device for indicating the wear level comprises a plurality of circumferentially oriented grooves, these grooves being arranged along concentric circles and centred on the axis of rotation.

Preferably, each groove is circumferentially continuous in order to make a complete turn around the tire so as to be more readily identified by an observer having to monitor the remaining thickness to be worn.

Still more preferably, the depth of each groove is associated with its position with respect to the rolling surface of the tread in the new state, this depth being able to decrease when the distance with respect to the rolling surface in the new state increases.

Advantageously, with each groove comprising lateral walls and a groove base interconnecting the lateral walls, at least this groove base is coated with a colored material able to reflect light.

This wear-monitoring device can be produced on only one lateral part of a tread or on both lateral parts.

In another advantageous variant, at least the base of each groove is coated with a color which is specific to the said groove. This arrangement allows improved indication and interpretation of the wear level and does so in a particularly dark environment such as an underground mine. Moreover, the index of each groove may also be coated with a color identical to that of the groove which it characterizes.

Other features and advantages of the invention will become apparent from the description given hereinbelow with reference to the appended drawings which show, by way of non-limiting examples, embodiments of the subject of the invention.

BRIEF DESCRIPTION OF THE FIGURES

FIG. 1 represents a plan view of a sidewall of a civil engineering tire provided with a plurality of grooves of circumferential orientation, these grooves being continuous;

FIG. 2 represents a sectional view of a part of the tread of the tire shown in FIG. 1;

DETAILED DESCRIPTION OF SPECIFIC EMBODIMENTS

Figure 3:
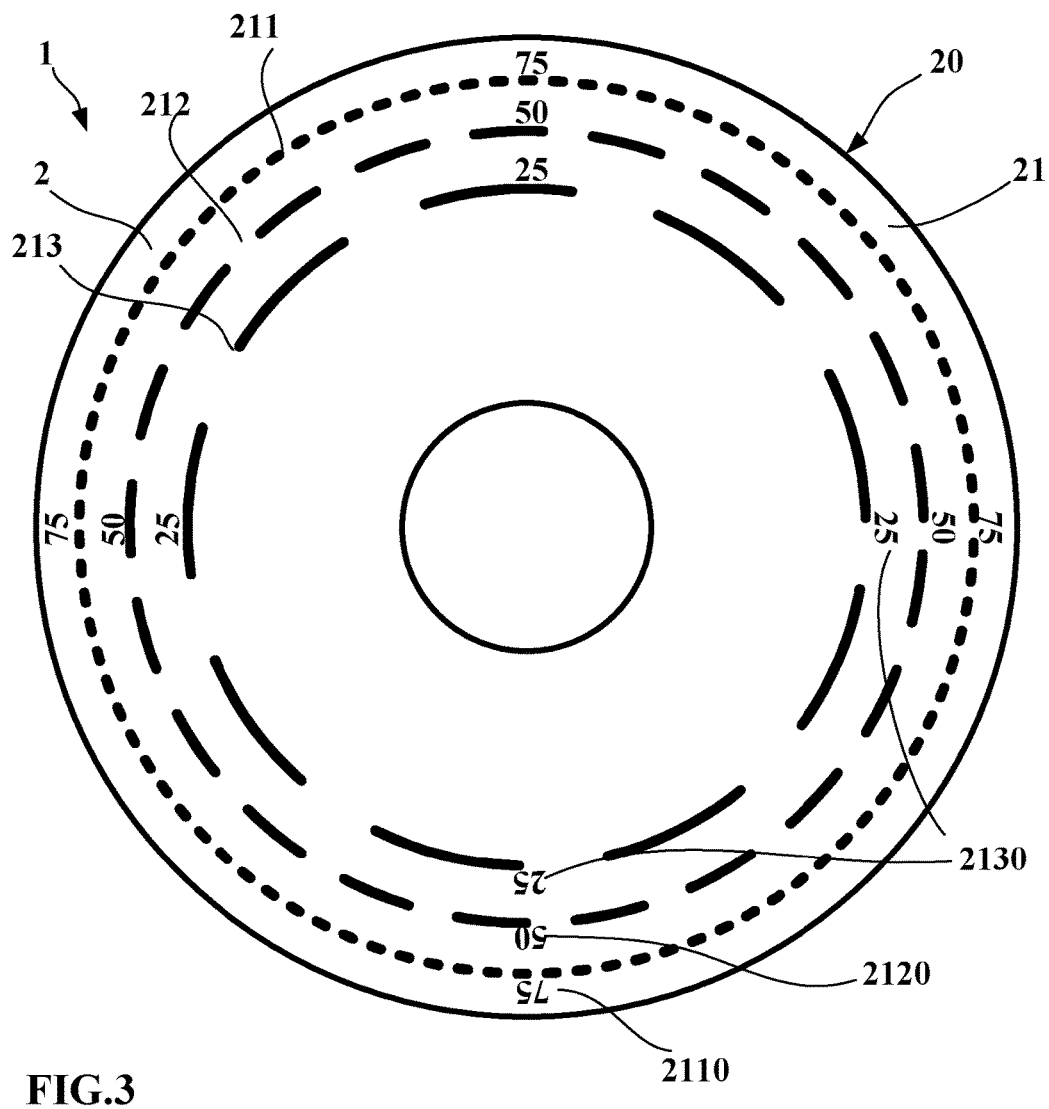
FIG. 3 shows another variant of a sidewall of a civil engineering tire according to the invention, this variant comprising a plurality of discontinuous grooves of circumferential orientation.

To facilitate reading of the figures, identical reference signs are employed for the description of variants of the invention as long as these reference signs refer to elements of the same nature, whether structural or else functional.

FIG. 1 represents a plan view of a side of a civil engineering tire, this tire being provided with a tread comprising a wear indicator device, this device being formed by a plurality of grooves of circumferential orientation, these grooves being continuous.

The tire 1 represented is a tire with a dimension of 26.5 R 25. It is provided with a tread 2 of an initial thickness E equal to 124 mm and of a width equal to 682 mm. This tread 2 comprises, in the new state, a rolling surface 20 intended to come into contact with the ground during rolling; this rolling surface 20 is extended on either side by lateral faces 21, the latter being themselves extended by the sidewalls 3 of the tire. These sidewalls 3 terminate in beads 4 intended to be in contact with a mounting rim. The tread is entirely without grooves opening onto its rolling surface 20 and all the material is therefore able to be worn during use.

A device for indicating the wear of the tread has been formed on one of the lateral faces 21 of the tread 2. This device comprises a series of three circumferentially continuous grooves 211, 212, 213, these grooves 211, 212, 213 being concentric and centred on the axis of rotation of the tire. In the example shown, each groove 211, 212, 213 is assigned a visual index 2110, 2120, 2130 respectively, each visual index indicating the remaining thickness to be worn. For example, the radially outermost groove 211 is combined with a visual index "75" thereby indicating that, once the wear of the tread has reached this groove, there remains to be worn a thickness equal to 75% of the initial thickness E. The depth of each groove is here equal to 10 mm.

The visual index pertaining to a groove is of course formed at different positions on this groove in order to facilitate its reading at the appropriate time.

In this example, and to enforce the visibility and interpretation of the remaining thickness to be worn, with each groove comprising lateral walls and a groove base interconnecting the said lateral walls, the base of each groove has been covered with a paint 5 having a color which is specific to each groove and able to reflect light. In this way, the reading in particularly unfavourable conditions, which are those encountered in underground mines, is facilitated as a result since the incident light from a front lamp is strongly reflected by the paint on the base of the groove. In a similar manner, this paint can be arranged on the base and on the walls of the grooves.

FIG. 2 represents a sectional view of a lateral part of the tread 2 and of a sidewall 3 of the tire 1 shown in FIG. 1.

This FIG. 2 shows the three grooves 211, 212, 213 of which the groove bases are coated with a paint 5 arranged after molding the tire, this paint being self-reflecting under conditions of virtually complete darkness or even complete darkness. The grooves are molded so as to be substantially perpendicular to the lateral surface 21 of the tread. In a variant which is not shown, they can be molded such that they are parallel to the axis of rotation.

FIG. 3 shows another variant of a civil engineering tire according to the invention, this variant comprising, on a lateral face 21 of the tread 2, a plurality of discontinuous grooves 211, 212, 213 of circumferential orientation. Each wear level corresponding to a visual index 2110, 2120, 2130 indicating the remaining thickness to be worn comprises a succession of a plurality of small grooves.

This variant is advantageous in that the tread 2 is weakened to only a slight extent since the amount of absent material (associated with each groove) is limited as compared with the example shown in FIGS. 1 and 2.

According to this variant, the number of grooves per wear level (corresponding to each visual index) decreases with the thickness remaining to be worn. In another variant, this number could increase with the thickness remaining to be worn.

Of course, it would be possible to combine this variant with the presence of a colored coating which may be self-reflecting in order to promote its reading at the appropriate time. It would also be advantageous to provide for the visual indexes 2110, 2120, 2130 to each have a color in relation to the plurality of grooves which it accompanies.

With the invention having been described using these two variants, it should be understood that the invention is not limited to these variants and various modifications can be made thereto without departing from the scope defined by the claims. In particular, a wear indicator device according to the invention may be provided on each lateral part of a tread.

The invention claimed is:

1. A method of determining a tread depth of a tire for a civil engineering vehicle, comprising the steps of:
   providing a tire in an underground mine and in near total darkness, the tire having a tread of high initial thickness E in a new state, this thickness corresponding to the thickness of material which can be worn during use, this tread comprising;
   a smooth rolling surface, without any recesses, intended to come into contact with ground in the underground mine during rolling, this tread being limited axially by lateral faces, these lateral faces being extended radially on the tire by sidewalls,
   a wear indicator device to visually indicate a wear level of the tread, which comprises, in combination,
   a plurality of circumferentially oriented grooves formed on at least one of the lateral faces of the tread and arranged along concentric circles and centered on an axis of rotation of the tire,
   for each groove, a coating of a light-reflecting colored material indicating a wear level corresponding to the percentage of the initial thickness E remaining to be worn, and
   wherein the depth of each groove is associated with its position with respect to the rolling surface of the tread in the new state, these depths decreasing when the distance with respect to the surface increases;

shining a light from a lamp into the circumferentially oriented grooves; and determining the tread depth in response to light reflected by the colored material of the coatings in the grooves.

2. The method according to claim 1, wherein each groove is circumferentially continuous in order to make a complete turnaround the tire.

3. The method according to claim 1, wherein each groove is coated with a color which is specific to it.

4. The method according to claim 1, wherein each of the circumferentially oriented grooves extends discontinuously around the axis of rotation of the tire such that each circumferentially oriented groove comprises discontinuous grooves.

5. The method according to claim 4 wherein the plurality of circumferentially oriented grooves are arranged in a first layer which is spaced a first radial distance from the axis of rotation and a second layer which is spaced a second radial distance from the axis of rotation and a third layer which is spaced a third radial distance from the axis of rotation and wherein the second radial distance is greater than the first radial distance and wherein the third radial distance is greater than the second radial distance.

6. A method of determining a tread depth of a tire for a civil engineering vehicle, comprising the steps of:

providing a tire in an underground mine and in near total darkness, the tire having a tread of high initial thickness E, this thickness corresponding to the thickness of material which can be worn during use, this tread comprising;

a smooth rolling surface, without any recesses, intended to come into contact with ground in the underground mine during rolling, this tread being limited axially by lateral faces, these lateral faces being extended radially on the tire by sidewalls, a wear indicator device to visually indicate a wear level of the tread, which comprises, in combination, a plurality of circumferentially oriented grooves formed on at least one of the lateral faces of the tread and arranged along concentric circles and centered on an axis of rotation of the tire, wherein each of the circumferentially oriented grooves extends discontinuously around the axis of rotation of the tire such that each circumferentially oriented groove comprises discontinuous grooves, and wherein the plurality of circumferentially oriented grooves are arranged in a first layer which is spaced a first radial distance from the axis of rotation and a second layer which is spaced a second radial distance from the axis of rotation and a third layer which is spaced a third radial distance from the axis of rotation and wherein the second radial distance is greater than the first radial distance and wherein the third radial distance is greater than the second radial distance, wherein the number of discontinuous grooves varies between the first and second and third layers, and for each groove, a coating of a light-reflecting colored material indicating a wear level corresponding to the percentage of the initial thickness E remaining to be worn;

shining a light from a lamp into the circumferentially oriented grooves; and determining the tread depth in response to light reflected by the colored material of the coatings in the grooves.

7. The method according to claim 6 wherein the third layer has more discontinuous grooves than the second layer and wherein the second layer has more discontinous grooves than the first layer.

* * * * *